US011479357B1

United States Patent
Nevdahs et al.

(10) Patent No.: US 11,479,357 B1
(45) Date of Patent: Oct. 25, 2022

(54) PERSPECTIVE ANGLE ACQUISITION AND ADJUSTMENT OF SECURITY CAMERA DRONE

(71) Applicant: Alarm.com Incorporated, Tysons, VA (US)

(72) Inventors: Ilja Nevdahs, Carnikava (LV); Agris Kipurs, Jelgava (LV); Olegs Cevacins, Jurmala (LV); Davids Ezers, Liepaja (LV)

(73) Assignee: Alarm.com Incorporated, Tysons, VA (US)

( * ) Notice: Subject to any disclaimer, the term of this patent is extended or adjusted under 35 U.S.C. 154(b) by 306 days.

(21) Appl. No.: 16/820,179

(22) Filed: Mar. 16, 2020

Related U.S. Application Data

(60) Provisional application No. 62/819,127, filed on Mar. 15, 2019.

(51) Int. Cl.
*B64C 39/00* (2006.01)
*B64C 39/02* (2006.01)
*G08G 5/00* (2006.01)

(52) U.S. Cl.
CPC ......... *B64C 39/024* (2013.01); *G08G 5/0069* (2013.01); *B64C 2201/024* (2013.01); *B64C 2201/123* (2013.01); *B64C 2201/127* (2013.01)

(58) Field of Classification Search
CPC ............ B64C 39/024; B64C 2201/024; B64C 2201/123; B64C 2201/127; G08G 5/0069
See application file for complete search history.

(56) References Cited

U.S. PATENT DOCUMENTS

| | | | |
|---|---|---|---|
| 9,292,705 B2 | 3/2016 | Lemmey et al. | |
| 9,734,684 B2 | 8/2017 | Bryson et al. | |
| 9,819,911 B2 | 11/2017 | K V et al. | |
| 9,864,372 B2 | 1/2018 | Chen et al. | |
| 10,319,243 B2 * | 6/2019 | Kreiner | B64C 39/024 |
| 11,267,568 B2 * | 3/2022 | Sun | B64C 39/024 |
| 2016/0116914 A1 | 4/2016 | Mucci | |
| 2016/0198088 A1 * | 7/2016 | Wang | B64D 47/08 348/36 |
| 2016/0266579 A1 * | 9/2016 | Chen | B64C 39/024 |
| 2017/0225680 A1 * | 8/2017 | Huang | B60T 7/22 |
| 2017/0272663 A1 * | 9/2017 | Wang | H04N 5/45 |
| 2017/0301109 A1 * | 10/2017 | Chan | G06K 9/6201 |
| 2018/0246529 A1 * | 8/2018 | Hu | G05D 1/0016 |
| 2018/0288303 A1 * | 10/2018 | Wang | G01S 17/86 |

(Continued)

*Primary Examiner* — Peter D Nolan
*Assistant Examiner* — Peter Y Ning
(74) *Attorney, Agent, or Firm* — Fish & Richardson P.C.

(57) ABSTRACT

Techniques, devices, and systems are described for determining and adjusting a perspective angle of a drone sensor such as a camera. A described drone system can include an aerial drone; a ground station; an actuator to adjust the drone camera's field of view; and a controller. The controller can be configured to receive an event associated with one or more spatial coordinates or zones, determine the camera's current perspective angle, determine a target perspective angle based on the event such that the target perspective angle will cause the camera to capture imagery from the one or more spatial coordinates or zones, and cause the actuator to adjust the camera from the current perspective angle to the target perspective angle.

26 Claims, 8 Drawing Sheets

(56) References Cited

U.S. PATENT DOCUMENTS

| | | | |
|---|---|---|---|
| 2019/0144114 A1* | 5/2019 | Chen | G05D 1/101 |
| | | | 701/2 |
| 2019/0162358 A1* | 5/2019 | Wang | B64C 39/024 |
| 2019/0179346 A1* | 6/2019 | Sasao | G06V 20/176 |
| 2019/0196467 A1* | 6/2019 | Aldana Lopez | G08G 5/045 |
| 2020/0122830 A1* | 4/2020 | Anderson | B64D 47/08 |

* cited by examiner

PERSPECTIVE ANGLE ACQUISITION AND ADJUSTMENT OF SECURITY CAMERA DRONE

CROSS REFERENCE TO RELATED APPLICATION

This disclosure claims the benefit of the priority of U.S. Provisional Patent Application No. 62/819,127, entitled "PERSPECTIVE ANGLE ACQUISITION AND ADJUSTMENT OF SECURITY CAMERA DRONE" and filed on Mar. 15, 2019. The above-identified application is incorporated herein by reference in its entirety.

TECHNICAL FIELD

This disclosure relates to drone-based surveillance.

BACKGROUND

An unmanned aerial vehicle (UAV), or a drone device, refers to an electronic device that is capable of navigating, either under remote control by a human operator, or fully or intermittently autonomously, by onboard computers. Drone devices can be associated with a monitoring system of a property to perform various types of monitoring operations of the property. For example, a camera of a drone device can capture video footage of a property premises while performing a surveillance operation.

SUMMARY

Techniques, devices, and systems are described for determining and adjusting a perspective angle of a drone sensor such as a camera. A described technique includes receiving, by a controller, an event associated with one or more spatial coordinates or zones; determining, by the controller while an aerial drone is docked with a ground station, a current perspective angle of a camera mounted on an aerial drone; determining, by the controller, a target perspective angle of the camera based on the event such that the target perspective angle will cause the camera to capture imagery from the one or more spatial coordinates or zones; and adjusting, by an actuator communicatively coupled with the controller, the camera from the current perspective angle to the target perspective angle.

This and other implementations can include one or more of the following features. In some implementations, the ground station includes the actuator. In some implementations, adjusting the camera includes sending one or more control commands to the ground station to engage the actuator to adjust a field of view of the camera. In some implementations, the ground station includes the controller. In some implementations, the aerial drone includes the actuator. In some implementations, the actuator includes a propulsion system of the aerial drone. In some implementations, the ground station includes a guide or lock. Implementations can include operating the propulsion system to generate thrust to move an orientation of the camera using the guide or lock. In some implementations, the event is triggered by one or more sensors located at a property, an alarm system associated with the property, or both.

In some implementations, the ground station includes a marker. Determining the current perspective angle can include obtaining data from a sensor configured to detect an orientation of the camera; and determining the current perspective angle of the camera based on the data from the sensor with respect to the marker. Implementations can include causing the aerial device to deploy in response to the event. Implementations can include causing the camera to capture imagery at the target perspective angle while the aerial drone is docked with the ground station.

A described drone system can include an aerial drone comprising a camera; a ground station configured to dock with the aerial drone; an actuator to adjust a field of view of the camera; and a controller. The controller can be configured to receive an event associated with one or more spatial coordinates or zones. The controller can be configured to determine a current perspective angle of the camera while the aerial drone is docked with the ground station. The controller can be configured to determine a target perspective angle of the camera based on the event such that the target perspective angle will cause the camera to capture imagery from the one or more spatial coordinates or zones. The controller can be configured to cause the actuator to adjust the camera from the current perspective angle to the target perspective angle while the aerial drone is docked with the ground station.

This and other implementations can include one or more of the following features. In some implementations, the ground station includes the actuator. In some implementations, the controller is configured to send one or more control commands to the ground station to engage the actuator to adjust the field of view. In some implementations, the ground station includes the controller. In some implementations, the aerial drone includes the actuator. In some implementations, the actuator includes a propulsion system of the aerial drone. In some implementations, the ground station includes a guide or lock. The aerial drone can be configured to use the propulsion system to generate thrust to move an orientation of the camera using the guide or lock. In some implementations, the aerial drone includes the controller. In some implementations, the event is triggered by one or more sensors located at a property, an alarm system associated with the property, or both. In some implementations, the controller is configured to cause the actuator to change the field of view of the camera based on a user input. Implementations can include a sensor to detect an orientation of the camera. In some implementations, the ground station includes a marker. The controller can be configured to determine the current perspective angle of the camera based on data from the sensor with respect to the marker. In some implementations, the controller is configured to cause the aerial drone to deploy in response to the event. In some implementations, the controller is configured to cause the camera to capture imagery at the target perspective angle while the aerial drone is docked with the ground station.

In some implementations, the controller can be configured to determine a target perspective angle of the camera based on the event such that the target perspective angle will cause the camera to capture imagery from the one or more spatial coordinates or zones when the aerial drone is deployed in response to the event. The controller can be configured to cause the actuator to adjust the camera from the current perspective angle to the target perspective angle while the aerial drone is docked with the ground station. The controller can be configured to cause the aerial drone to deploy in response to the event.

Particular configurations of the technology described in this disclosure can be implemented so as to realize one or more of the following potential advantages. Adjusting the field of view of a drone's sensor can help the drone better collect sensor data in response to an event. A ground station based mechanism to adjust the drone sensor's field of view can provide a cost efficient solution for dynamically adjusting the sensor's field of view.

The details of one or more implementations are set forth in the accompanying drawings and the description below. Other features will be apparent from the description and drawings.

DETAILED DESCRIPTION

A drone system can include an aerial drone such as unmanned aerial vehicle (UAV) and a ground station (GS). The GS can be referred to as a Charging Station, Base Station, Docking Station, or a Landing Pad. The aerial drone can be referred to as a Security Camera Drone (SCD). The SCD can be an autonomous drone used for security purposes and equipped with one or more sensors such as surveillance cameras. A drone's sensor such as a camera can have a field of view (FOV). The sensor's FOV can be changed by one or more actuators in the drone system to enable the sensor to capture data at a different perspective angle during flight operations. In between flights, the drone can be docked on a GS for a battery recharge. While docked, the sensor's FOV can also be changed if required. In some implementations, the drone can perform continuous long-time surveillance when docked. Further, the drone system can be configured to respond to events such as alarm events or user inputs. A response can include adjusting the sensor's FOV based on the event to better position the sensor to collect sensor data relevant to what triggered the event, and, as needed, launching the drone to collect sensor data.

Figure 1:
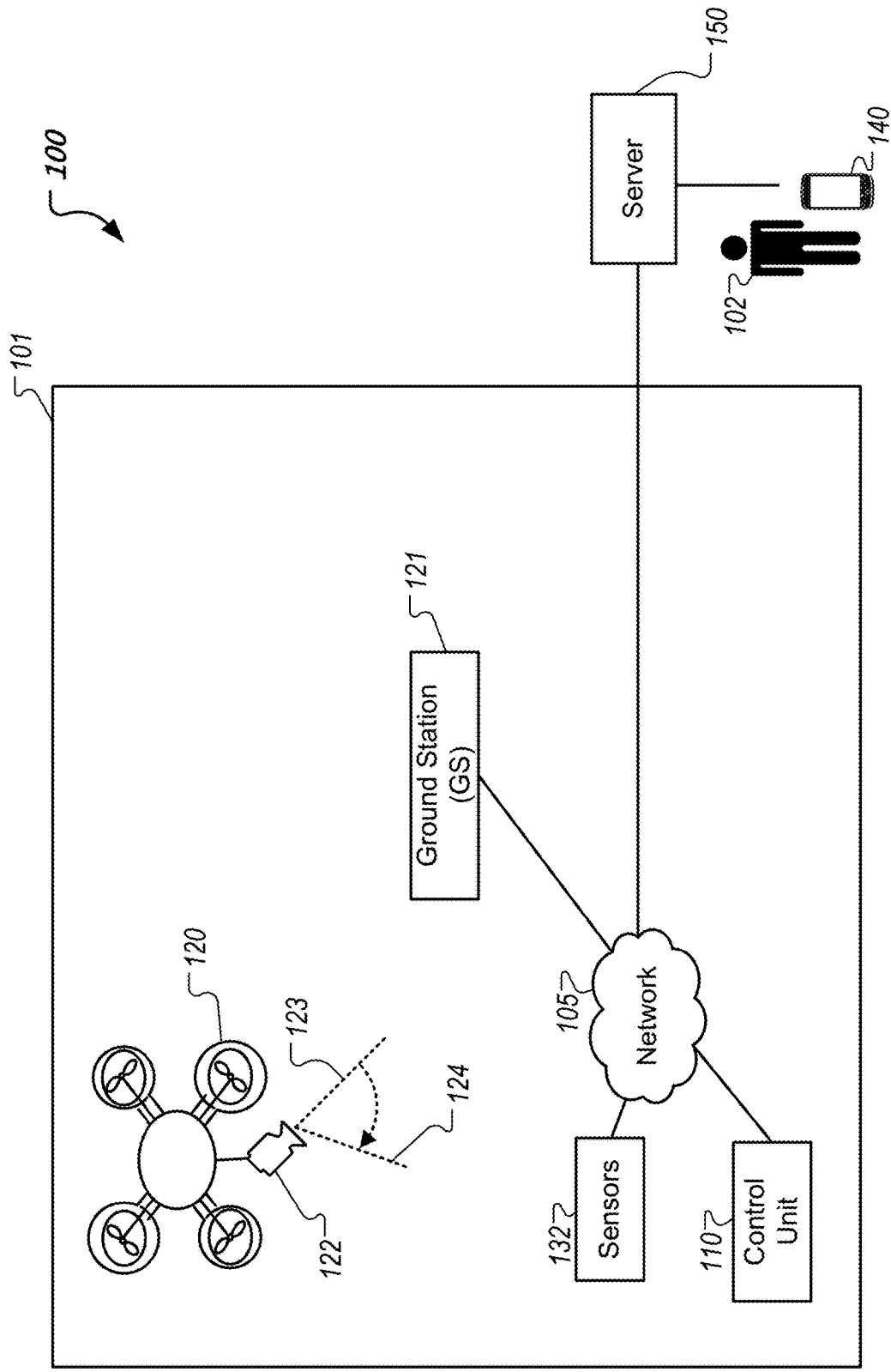
FIG. 1 illustrates an example of an electronic system that is capable of adjusting one or more camera perspective angles associated with a security camera drone.

FIG. 1 illustrates an example of an electronic system 100 that is capable of adjusting one or more camera perspective angles associated with a security camera drone based on one or more inputs such as user input or an alarm system event. The electronic system 100 includes a control unit 110, a security camera drone 120, ground station 121, sensors 132, a user device 140, and an application server 150 connected over a network 105 within a property 101. The user device 140 can be associated with a user 102 such as an individual that is authorized to access the property 101 and/or control monitoring operations of the system 100. The application server 150 further includes an asset repository 152 for storing information associated with assets that are located within the property 101. The asset repository 152 may additionally or alternatively stored locally on the control unit 110 and/or the user device 140. The system 100 enables the user 102 to configure and adjust various types of monitoring operations that are associated with the property 101. As examples, the user 102 can use the system 100 to view and collect security footage captured by the sensors 132, and track detected movement through the property premises.

The user 102 can use the system 100 to locally or remotely transmit instructions to the drone 120 to perform a specified action. For example, the user 102 may use the system 100 to transmit an instruction to the drone 120 to perform a surveillance operation of the premises of the property 101. In other examples, the user 102 may use the system 100 to monitor, track, and manage assets that are located within the property 101. In such examples, the drone 120 may periodically navigate through the indoor environment of the property 101 and check the status of assets located within the property 101. As described in greater detail below, the drone 120 may also perform specified actions in response to detecting status changes of assets indicating security breaches and/or other problematic conditions.

When the user 102 is remote from the property 101, as depicted in FIG. 1, the user 102 may use a mobile application on the user device 140 to remotely transmit instructions to perform specified actions. In some implementations, the instructions are transmitted to the application server 150, and then relayed to local devices such as the drone 120 through the control unit 110. In other implementations, the drone 120 may also be capable of directly exchanging communications with the application server 150. Although the system 100 can be used to perform general purpose monitoring operations, as described above, the descriptions herein are directed to the use of instructions to control and adjust the operation of the drone 120 for brevity.

The network 105 is configured to enable exchange of electronic communications between devices of the system 100 that are connected to the network 105. For example, the network 105 can be configured to enable exchange of electronic communications between the control unit 110, the drone 120, the sensors 132, the user device 140, and the application server 150. The control unit 110 may store sensor and image data received from the system 100 and perform analysis of sensor and image data received from the system 100. Based on the analysis, the control unit 110 may communicate with, and control aspects of, the drone 120, the sensors 132, or the user device 140 via the network 105. The drone 120 can include a communication module that enables the drone 120 to communicate other devices of the system 100. The communication module can be a wireless communication module that allows the drone 120 to communicate wirelessly.

In some implementations, the drone 120 can be an unmanned drone device, such as a UAV, that is capable of moving throughout the property 101 based on automated control technology and/or user input control provided by a user. In some implementations, the drone 120 can be a helicopter type drone device such as a quad copter or a fixed-wing plane type drone device. In some instances, the drone 120 can be a robotic device that is intended for other purposes and associated with the system 100 for use in appropriate circumstances. For instance, a security drone can be associated with the system 100 as the drone 120 and can be controlled to take action responsive to system events.

The drone 120 include one or more sensors such as a camera 122. Other types of sensors are possible such as one or more motion sensors, one or more microphones, one or more biometric data collection tools, one or more temperature sensors, one or more humidity sensors, one or more air flow sensors, and/or any other types of sensors that can be useful in capturing monitoring data related to the property and users in the property. In some implementations, the drone 120 can include multiple cameras.

The drone's camera 122 can be a video/photographic camera or other type of optical sensing devices configured to capture images. For instance, the camera can be configured to capture images of an area within a building monitored by the control unit 110. The camera 122 can be configured to capture single, static images of the area and also video images of the area in which multiple images of the area are captured at a relatively high frequency (e.g., thirty images per second). In some implementations, the camera 122 can be controlled based on commands received from the control unit 110. The field of view of the camera 122 can be changed from a current perspective angle 123 to a desired perspective angle 124. In some implementations, the drone 120 includes an actuator to make the change between perspective angles 123, 124. In some implementations, the ground station 121 includes an actuator to make the change between perspective angles 123, 124. In some implementations, the FOV of the camera 122 can be adjusted based on commands specifying polar coordinates.

The drone 120 can be configured to automatically navigate within the property 101. For instance, the drone 120 can include sensors and control processors that guide movement of the drone 120 within the property. The drone 120 may navigate within the property using one or more cameras 122, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The drone 120 can include control processors that process output from the various sensors and control the drone 120 to move along a navigational route that reaches the desired destination and avoids obstacles. In this regard, the control processors detect walls or other obstacles in the property and guide movement of the drone 120 in a manner that avoids the walls and other obstacles.

In addition, the drone 120 may store data that describes attributes of the property 101. For instance, the drone 120 may store a floorplan and/or a three-dimensional model of the property 101 that enables the drone 120 to navigate the property 101. During initial configuration, the drone 120 may receive the data describing attributes of the property 101, determine a frame of reference to the data (e.g., a home or reference location in the property 101), and navigate the property 101 based on the frame of reference and the data describing attributes of the property 101. Further, initial configuration of the drone 120 also can include learning of one or more navigation patterns in which a user or a system administrator provides input to control the drone 120 to perform a specific navigation action (e.g., fly to an upstairs bedroom and spin around while capturing video and then return to a home charging base). In this regard, the drone 120 may learn and store the navigation patterns such that the drone 120 may automatically repeat the specific navigation actions when instructed to assist a user during a detected emergency condition at the property.

The drone 120 can be associated with a ground station 121. The ground station 121 can be located at a predefined or reference location within a property. The drone 120 can be configured to navigate to the ground station 121 after successfully performing a particular specified action. For instance, after completing the specified action upon instruction by the control unit 110, the drone 120 can be configured to automatically fly to and land on one of the ground station 121. In this regard, the drone 120 may automatically maintain a fully charged battery in a state in which the drone 120 are ready for use by the system 100.

The ground station 121 can be a contact-based charging stations and/or wireless charging stations. For contact-based charging stations, the drone 120 may have readily accessible points of contact that the drone 120 are capable of positioning and mating with a corresponding contact on the ground station 121. For instance, a helicopter type robotic device may have an electronic contact on a portion of its landing gear that rests on and mates with an electronic pad of a ground station 121 when the helicopter type robotic device lands on the ground station 121. The electronic contact on the robotic device can include a cover that opens to expose the electronic contact when the robotic device is charging and closes to cover and insulate the electronic contact when the robotic device is in operation.

For a wireless charging type of ground station 121, the drone 120 may charge through a wireless exchange of power. In these cases, the drone 120 need only locate themselves closely enough to the wireless charging stations for the wireless exchange of power to occur. In this regard, the positioning needed to land at a predefined home base or reference location in the property can be less precise than with a contact-based charging station. Based on the drone 120 landing at a wireless charging station, the wireless charging station outputs a wireless signal that the drone 120 receive and convert to a power signal that charges a battery maintained on the drone 120.

As described above, the drone 120 may exchange communications with the control unit 110, the sensors 132, the user device 140, and the application server 150 over the network 105 or any other suitable communication means. For example, the drone 120 may utilize a wireless data pathway configured to transmit signals from the control unit 110, the sensors 132, the user device 140, and the application server 150 to a controller. The control unit 110, the sensors 132, the user device 140, and the application server 150 may continuously transmit sensed values to the controller, periodically transmit sensed values to the drone 120, or transmit sensed values to the drone 120 in response to a change in a sensed value.

In some implementations, the drone 120 may additionally be used to perform routine surveillance operations on a property. For instance, the drone 120 can be assigned to one or more particular properties within a geographic location and may routinely collect surveillance footage during specified time periods (e.g., after dark), which may then be transmitted to the application server 150 for transmitting back to each particular property owner. In such implementations, the property owner may receive the surveillance footage over the network 105 as a part of a service provided by a security provider that operates the application server 150. For example, transmissions of the surveillance footage collected by the drone 120 can be part of a premium security service package provided by a security provider in addition to the routine drone emergency response service.

In some implementations, the system 100 can include multiple autonomous devices that exchange communications with one another to perform the monitoring operations described throughout. For example, a particular autonomous device can be designated to monitor a specified region of the property 101. Each autonomous device may then transmit collected data for each designated region to, for example, the control unit 110 and/or the application server 150, which then aggregates the collected data from each autonomous device. In such implementations, the multiple autonomous devices may operate as a distributed drone network to monitor region-specific property information.

The system 100 can include multiple sensors 132. The sensors 132 can include a contact sensor, a motion sensor, a glass break sensor, or any other type of sensor included in an alarm system or security system. The sensors 132 also can include an environmental sensor, such as a temperature sensor, a water sensor, a rain sensor, a wind sensor, a light sensor, a smoke detector, a carbon monoxide detector, etc. In some implementations, the sensors 132 can include one or more cameras. The cameras can be video/photographic cameras or other type of optical sensing devices configured to capture images. For instance, the cameras can be configured to capture images of an area within a building monitored by the control unit 110. The cameras can be configured to capture single, static images of the area and also video images of the area in which multiple images of the area are captured at a relatively high frequency (e.g., thirty images per second). The cameras can be controlled based on commands received from the control unit 110.

The user device 140 can be any type of personal electronic computing device that is associated with users that reside within the property 101 (e.g., a tenant, temporary visitor, guest, etc.). The user device 140 can be one or more of a cellular telephone, smartphone, a tablet-computing device, a laptop computing device, a desktop computing device, a wearable device, or any other type of network-enabled electronic device.

The user device 140 can include a native application that enables communications with devices located within the property 101 through the application server 150. The native application refers to software/firmware programs running on the user device 140 that enable various features. For instance, the user device 140 may load or install the native application based on data received over a network 105 or data received from local media. The native application may run on various mobile device platforms associated with the user device 140.

The application server 150 can be an electronic device configured to provide monitoring services by exchanging electronic communications with the control unit 110, the drone 120, the sensors 132, and the user device 140 over the network 105. The application server 150 can be configured to monitor events (e.g., alarm events, emergency conditions, etc.) generated by the control unit 110. For example, the application server 150 may exchange electronic communications with the network module included in the control unit 110 to receive information regarding events (e.g., fire, carbon monoxide) detected by the control unit 110.

The application server 150 may store sensor and image data received from the system 100 and perform analysis of sensor and image data received from the system 100. Based on the analysis, the application server 150 may communicate with and control aspects of the control unit 110, the drone 120, or the user device 140. In addition, the application server 150 may store dynamic object data (e.g., based on sensor data collected by the sensors 132), or information associated with dynamic object data (e.g., historical status information associated with dynamic objects). The application server 150 may also store data associated with the dynamic multi-dimensional spatial representations that are determined for the property 101. For example, the application server 150 may store historical data associated with previously generated spatial representations of the property 101 over a specified period of time.

Figure 2:
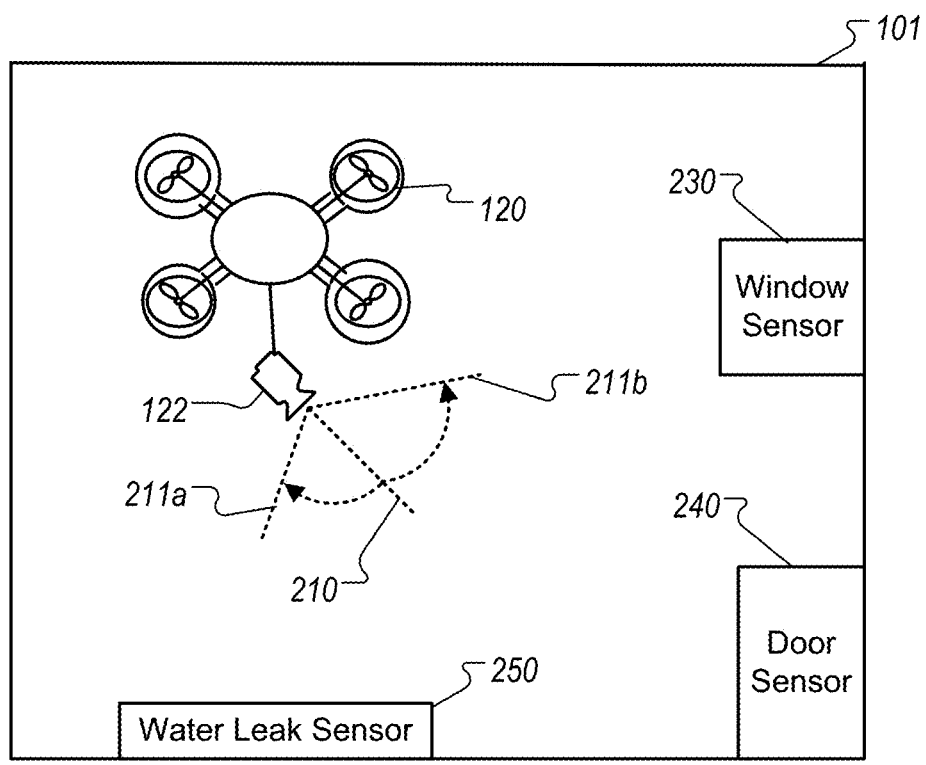
FIG. 2 illustrates an example of changing perspective angles of a drone's camera based on an event.

FIG. 2 illustrates an example of changing perspective angles of a drone's camera based on an event. The control unit 110 of FIG. 1 can generate an event such as an alarm event in response to a sensor input. For example, a window sensor 230 mounted on or adjacent to a window can be configured to detect the breaking of glass or opening of the window. A door sensor 204 mounted on a door can be detect the opening of the door. A water leak sensor 250 can detected a water leak. Based on the type of alarm event, e.g., window opening, door opening, or water leak detection, the perspective angle 210 of the camera 122 can be changed to a different perspective angle 211a, 211b. In some implementations, the drone 120 can obtain images when in flight, when docked, or both. For example, if the alarm event is a window open event, the perspective angle can be adjusted by an actuator to a perspective angle 211b that can cause the camera 122 to obtain images of the window associated with the window sensor 230 when the drone 120 is in flight. Alternatively, if the ground station is in view of the window, the perspective angle can be adjusted by an actuator to a perspective angle 211b that can cause the camera 122 to obtain images of the window associated with the window sensor 230 while the drone 120 is docked. If the alarm event is a water leak event, the perspective angle can be adjusted by an actuator to a perspective angle 211a that can cause the camera 122 to obtain images of the floor when the drone 120 is in flight. In some implementations, a default perspective angle 210 can be set such that the camera 122 can obtain images of the door associated with the door sensor 240 when the drone 120 is in flight or when docked if the ground station is in view of the door.

A drone such as a SCD, in some implementations, can be configured to change perspective angle automatically based on one or more events such as detection of a moving object in the FOV of one or more SCD sensors, one or more events triggered by external sensors or systems associated with spatial coordinates or zones, or a combination thereof. Various examples of events includes a window open event, door unlocked event, window break event, etc. Other types of events are possible.

In some implementations, the perspective angle of a FOV can be changed by a user or installer. In some implementations, the SCD can be configured to sense a current perspective angle and adjust it to match a desired perspective angle. In some implementations, a SCD can be configured to help ensure the same perspective angle of a FOV in between missions while the SCD is docked on the GS. In some implementations, the drone system enables a user to change a preset setting on the SCD, such as a perspective angle on demand, or relocate the GS to a different location.

In some implementations, during initial setup of the system, a desired perspective angle of the SCD can be set by positioning the GS and the SCD on the desired location and orientation, e.g., desired camera pose. In some implementations, a SCD can include one or more sensors such as one or more cameras to observe its pose relative to an environment. In some implementations, a desired perspective angle of SCD can be defined by its orientation in relation to the environment as sensed by one or more SCD sensors such as a camera.

In some implementations, a desired perspective angle of SCD can be defined by a pose of the GS. A GS, for example, can include one or more markers such as visual, mechanical, or magnetic markers, which enable the SCD to observe or sense its pose relative to the GS. In some implementations, the SCD can include one or more sensors such as a camera or a magnetic sensor to observe its pose relative to the GS.

After initial installation, the SCD may observe and record its initial pose relative to GS or relative to the surrounding environment. In some implementations, the SCD may assume its initial pose is the desired pose that SCD is to be positioned as when docked on GS. In some implementations, a user may set a different desired pose of the SCD relative to the GS or environment.

In some implementations, the GS can include guides, locks and/or actuators (hereafter, "GS GLA"). In some implementations, the guides, locks and/or actuators can limit or guide SCD movements or otherwise act on SCD when SCD is put or landed on the GS to enforce the same SCD pose relative to GS. In some implementations, the desired pose can be defined by pose of GS or configuration of the GS GLA.

In some implementations, a SCD can include one or more built-in actuators, such as a propulsion system or a camera gimbal, that can be used to adjust the drone sensor's camera perspective angle. In some implementations, a SCD can use one or more actuators to adjust its sensor's perspective angle when docked on GS. For example, a SCD with a rotor-based propulsion can spin one or more of its rotors to generate rotational or linear movement relative to GS in order to adjust its sensor pose. In some implementations, the GS can include additional actuators (inside or outside GS body) to adjust a sensor pose of the SCD as requested by the SCD over a communication link.

Figure 3:
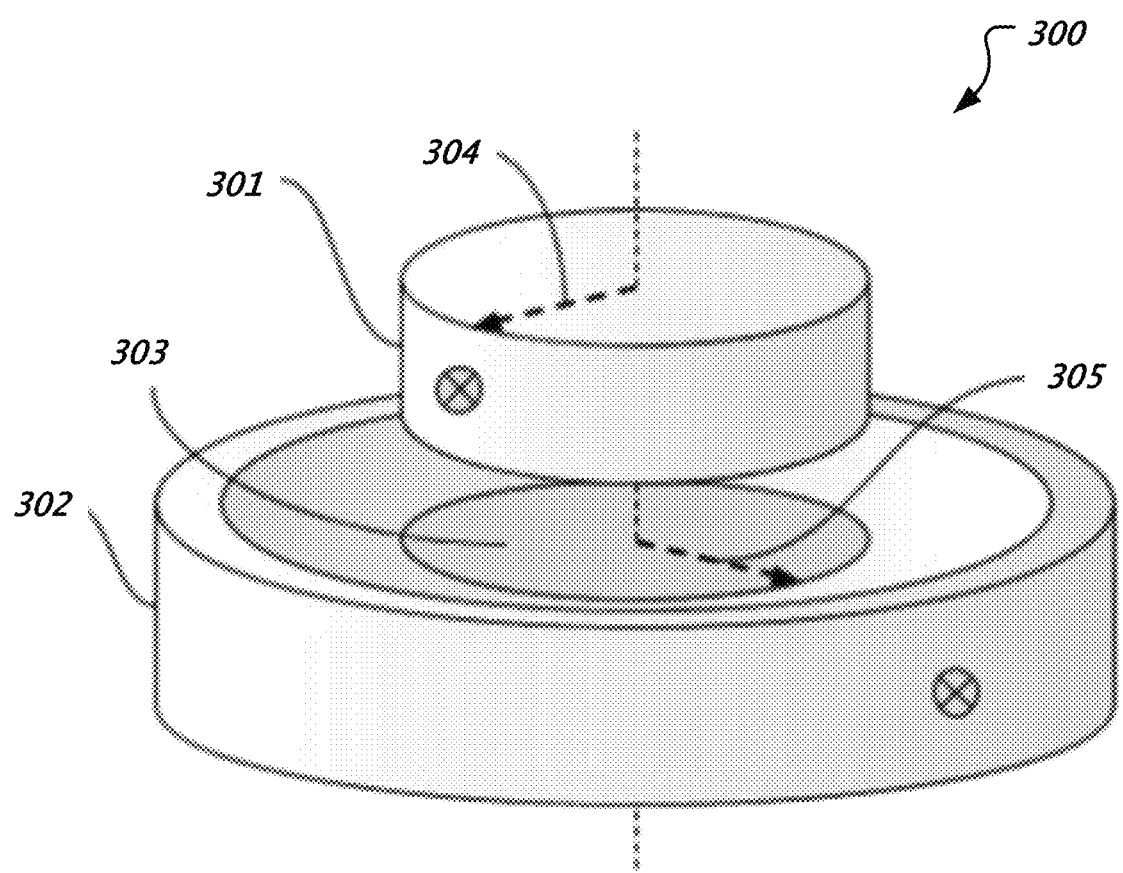
FIG. 3 illustrates an example of security camera drone and ground station relative sensor pose adjustment.

FIG. 3 illustrates an example of security camera drone 301 and ground station 302 relative sensor pose adjustment. A drone system 300 can include a security camera drone 301 and a ground station 302. In some implementations, the ground station 302 includes an inner landing pad 303. In some implementations, the security camera drone 301 may yaw when sitting on the landing pad 303. The drone system 300 can include an actuator to adjust the sensor pose. The actuator can rotate to change a camera pose of the security camera drone 301. In this example, the actuator can change a first orientation, i.e., current pose 304, of a camera of the security camera drone 301 to a desired second orientation, i.e., desired pose 305.

Figure 4A:
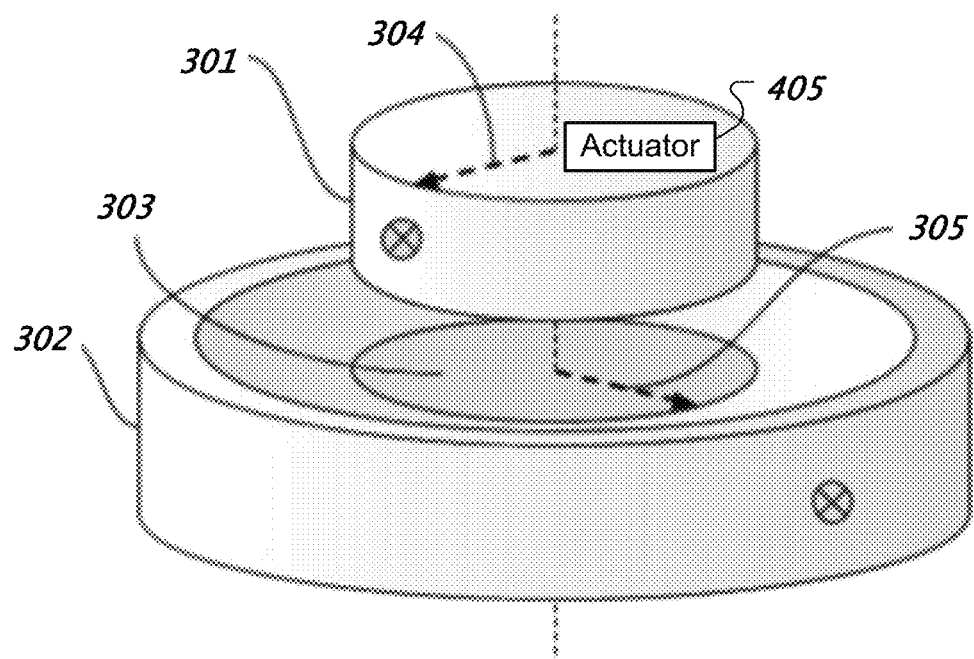
FIGS. 4A and 4B illustrate different example locations for an actuator to adjust the sensor's pose.
Figure 4B:
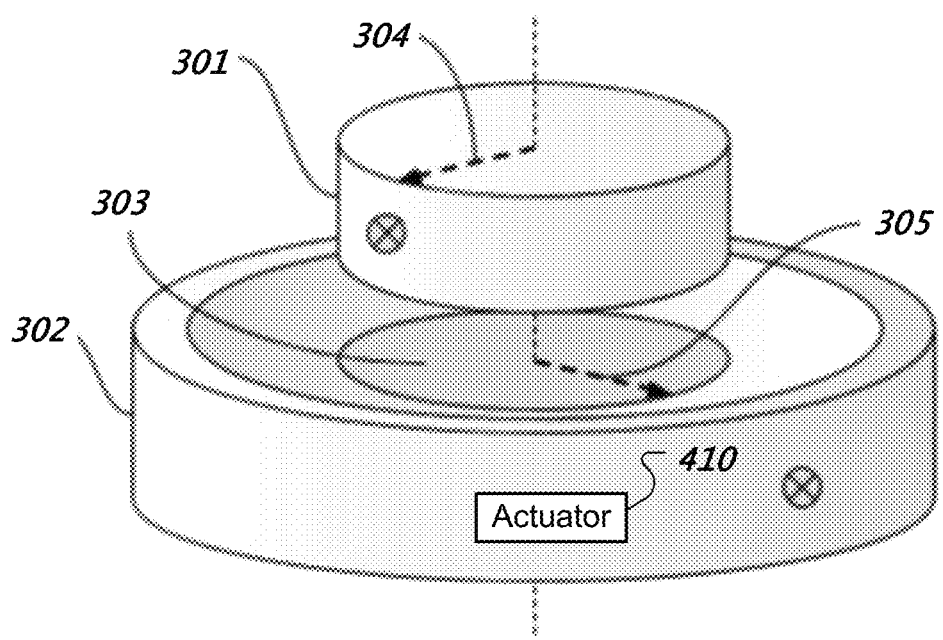

FIGS. 4A and 4B illustrate different example locations for actuators 405, 410 configured to adjust the sensor pose. In the example of FIG. 4A, the actuator 405 is a component of the security camera drone 301. In some implementations, the actuator 405 is the propulsion system of the drone 301. In example of FIG. 4B, the actuator 410 is a component of the ground station 302. In some implementations, the station's landing pad 303 can include the actuator 410.

In some implementations, when the security camera drone 301 is docked on the ground station 302, the security camera drone 301 can observe and compare its current pose 304 to a desired pose 305 relative to the ground station 302 or relative to the surrounding environment as sensed for example by one or more sensors and/or cameras of the security camera drone 301. In some implementations, if there is a difference between the current pose 304 and desired pose 305, the security camera drone 301 can issue one or more control commands to the ground station 302 to engage one or more actuators of the ground station 302 (e.g., actuator 410 of FIG. 4B) to adjust the camera pose. In some implementations, the security camera drone 301 includes one or more actuators (e.g., actuator 405 of FIG. 4A) to adjust its camera pose. If there is a difference between the current pose 304 and desired pose 305, the security camera drone 301 can issue one or more control commands to its actuators to adjust its pose.

A drone system can be configured to adjust the desired pose of a drone's sensor such as a camera. In some implementations, the drone system includes a user interface that enables the pose to be changed. For example, a user may choose to change the desired pose of the drone's camera. In some implementations, a pose can be defined by the ground station pose, and a user may reposition and/or change the ground station pose. If the desired pose is defined by an initial pose relative to the environment, the user can reposition the ground station and/or drone to a new desired pose and instruct the drone to record the new desired pose. In some implementations, the new desired pose of the drone's camera can be set by a user indirectly via a user control interface, such as buttons, sliders, mobile application, or other user interface. In some implementations, the drone's camera pose can be adjusted according to user inputs by engaging system actuators such as one or more of the drone's actuators such as built-in actuators, e.g., rotors, that provide propulsion for the drone.

In some implementations, the drone's sensor pose can be adjusted according to user inputs by engaging one or more system actuators in a ground station GLA configuration. If the desired pose is defined by a configuration of a ground station GLA, the user may adjust the configuration of the ground station GLA. In some implementations, the configuration of ground station GLA can be done directly by manually rotating or moving the ground station GLA. In some implementations, configuration of the ground station GLA can be positioned indirectly by manually rotating or moving the drone's sensor or via a user control interface, such as buttons, sliders, mobile app or other user interface. In some implementations, the drone can be programmed to adjust the desired pose automatically based on internal or external events such as, for example, a moving object detected in the FOV of one or more of the drone's sensors, events triggered by external sensors or systems associated with spatial coordinates or zones (window opened, door lock unlocked, etc.), or a combination thereof.

Figure 5:
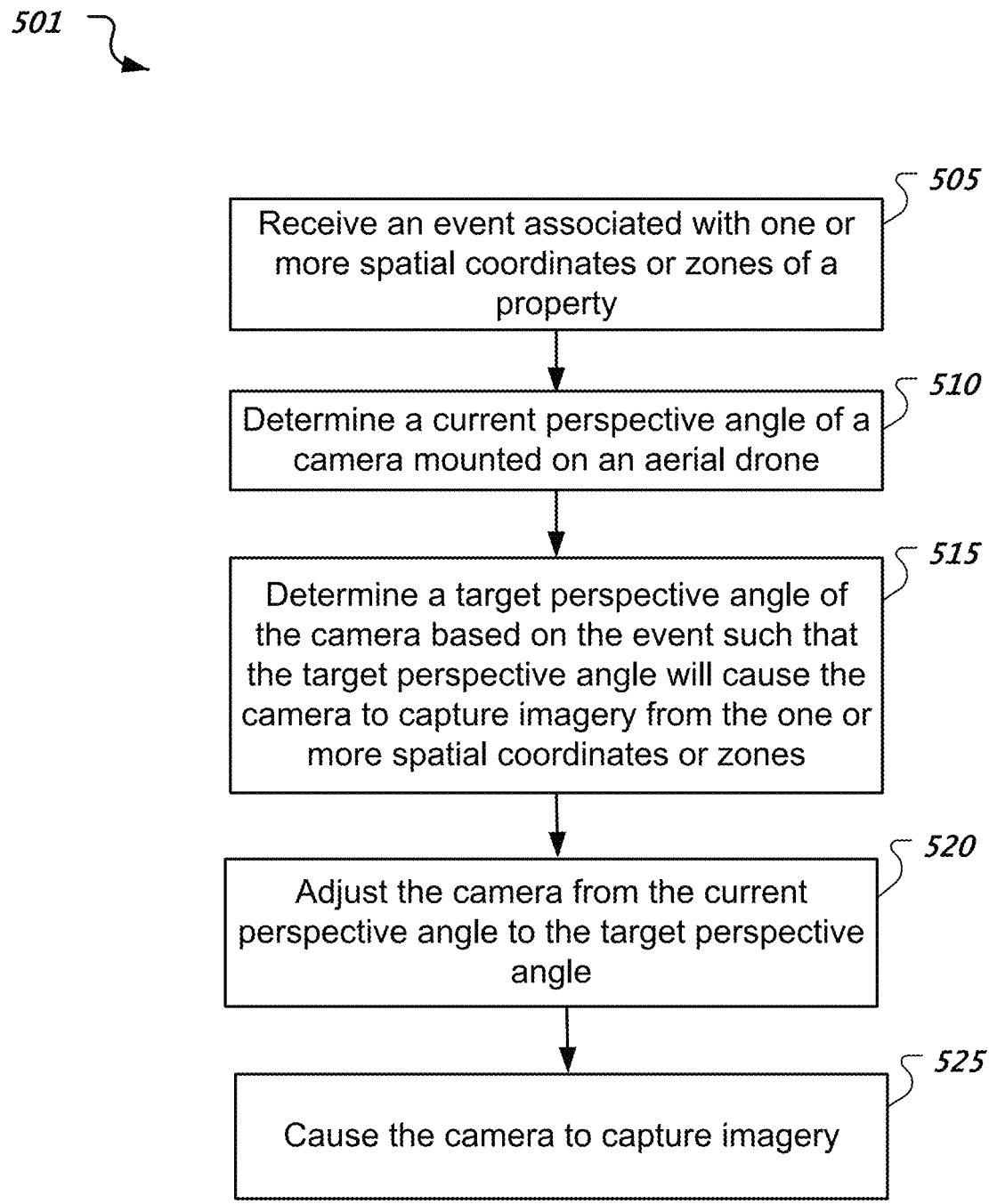
FIG. 5 illustrates a flowchart of an example adjustment process for a drone system.

FIG. 5 illustrates a flowchart of an example adjustment process 501 for a drone system. The adjustment process 501 can be performed at least in part by a controller such as the one shown in FIG. 7. At 505, the controller can receive an event associated with one or more spatial coordinates or zones of a property. In some implementations, the controller can access a database of property zones to associate an identified zone in the event with three-dimensional coordinates. In some implementations, the event is triggered by one or more sensors located at a property, an alarm system associated with the property, or both.

At 510, the controller can determine a current perspective angle of a camera mounted on an aerial drone. In some implementations, determining a current perspective angle can include determining a current sensor pose. In some implementations, the controller can obtain data from a sensor to detect an orientation of the camera. In some implementations, the ground station includes a marker that is used to determine camera orientation. For example, the controller can be configured to determine the current perspective angle of the camera based on data from the sensor with respect to the marker. In some implementations, the sensor to detect camera orientation can be the camera, where the camera obtains one or more images of the marker and the controller uses those one or more images to determine the current perspective angle. In some implementations, the marker is magnetic, and the sensor is a magnetic sensor that senses the marker's magnetic field.

At 515, the controller can determine a target perspective angle of the camera based on the event such that the target perspective angle will cause the camera to capture imagery from the one or more spatial coordinates or zones. In some implementations, the image capture can occur while the drone is docked. In some implementations, the target perspective angle will cause the camera to capture imagery from the one or more spatial coordinates or zones when the aerial drone is deployed in response to the event. For example, if the zone corresponds to a window, the controller can determine a target perspective angle based on a location of the window and a flight position of the drone that is suitable for capturing imagery from the window. In some implementations, the controller can access a database to obtain a location corresponding to a zone identified by an event. In some implementations, determining a target perspective angle can include determining a target sensor pose.

At 520, the controller can adjust the camera from the current perspective angle to the target perspective angle. In some implementations, the controller can cause, while the aerial drone is docked with a ground station, an actuator to change the perspective angle of the camera based on the event to adjust the camera's field of view to capture imagery from the one or more spatial coordinates or zones. In some implementations, the controller can use the drone's propulsion system to generate thrust to move an orientation of the camera using a guide or lock mechanism of a ground station. In some implementations, the ground station includes the actuator. The controller, for example, can be configured to send one or more control commands to the ground station to engage the actuator to adjust the camera's field of view. At 525, the controller can cause the camera to capture imagery. In some implementations, the controller is configured to cause the aerial drone to deploy in response to the event. In some implementations, the controller sends a launch command to a drone. In some implementations, the controller sends one or more commands to activate a propulsion system.

Figure 6:
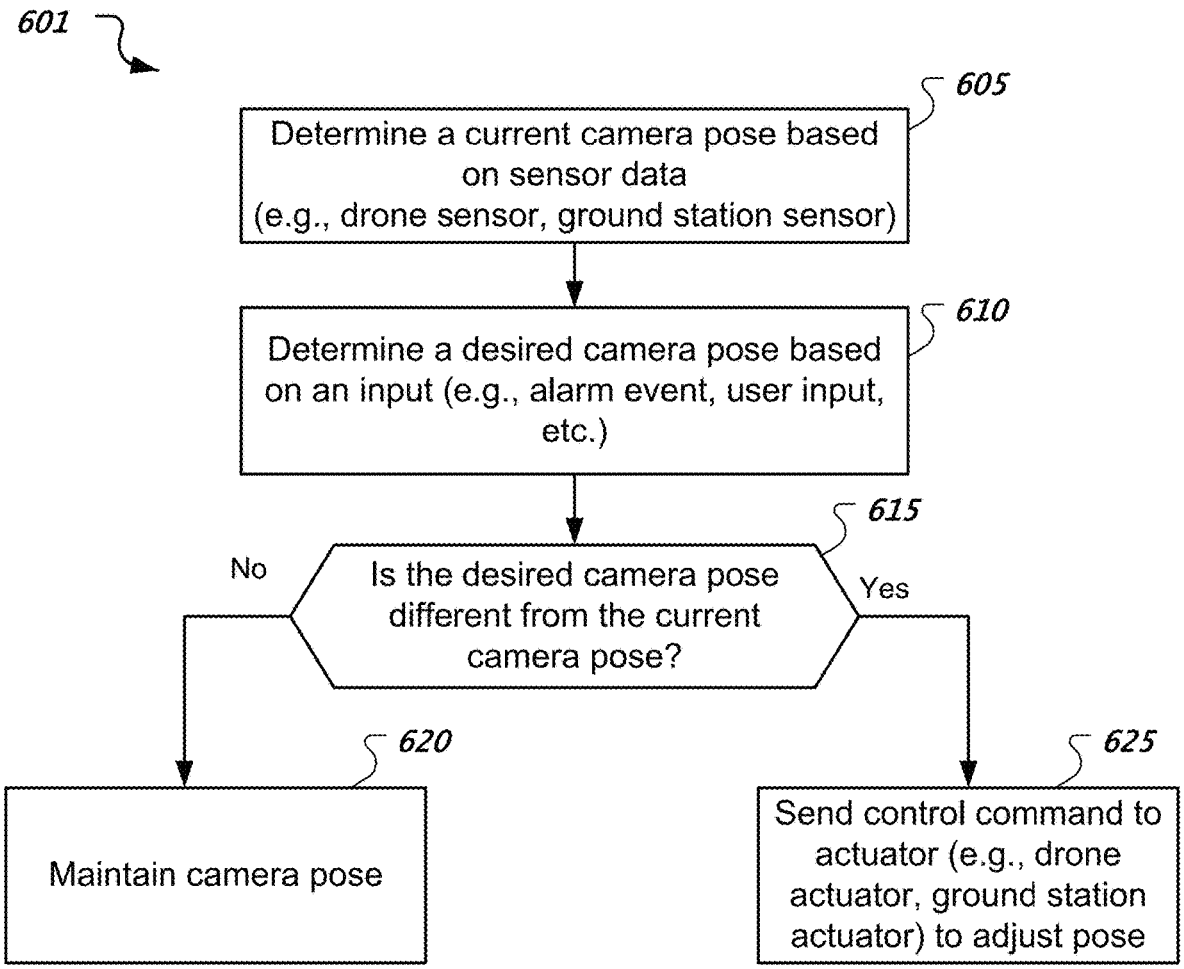
FIG. 6 illustrates a flowchart of another example adjustment process for a drone system.

FIG. 6 illustrates a flowchart of another example adjustment process 601 for a drone system. The adjustment process 601 can be performed at least in part by a controller such as the one shown in FIG. 7. At 605, the controller determines a current camera pose based on sensor data (e.g., drone sensor, ground station sensor). At 610, the controller determines a desired camera pose based on an input (e.g., alarm event, user input, etc.) At 615, the controller determines whether the desired camera pose is different from the current camera pose. If it is not different, the controller maintains the camera pose at 620. If it is different, the controller sends one or more control commands to an actuator (e.g., drone actuator, ground station actuator) to adjust pose at 625.

Figure 7:
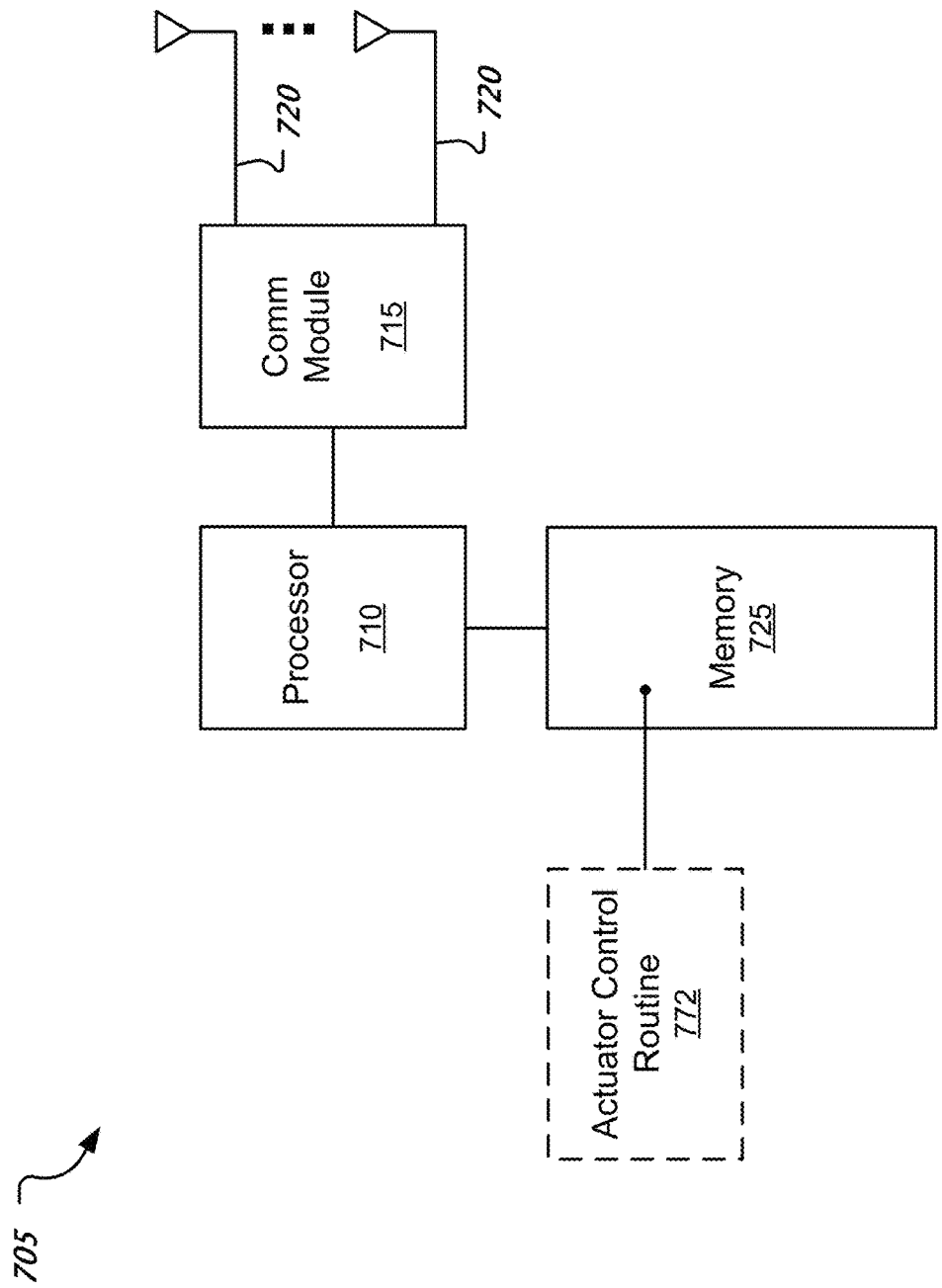
FIG. 7 shows a block diagram of an example of a controller.

FIG. 7 illustrates a block diagram of an example of a controller 705. The controller 705 can implement methods effecting one or more techniques presented in this disclosure. In some implementations, a drone includes the controller 705. In some implementations, a ground station includes the controller 705. In some implementations, the controller 705 is functionally distributed among a controller on a drone and a controller on a ground station. The controller 705 includes a processor 710, memory 725, and communication module 715. The controller 705 includes a processor 710 and a memory 725. In some implementations, the processor 710 includes one or more processor cores. In some implementations, the memory 725 can include random access memory (RAM) and non-volatile memory such a flash memory or a solid state drive (SSD).

The controller 705 includes a communication module 715 to receive events from one or more sources such as a sensor or an alarm system. The communication module 715 can be coupled with one or more antennas 720. In some implementations, the communication module 718 uses wireless technology IEEE 802.11, Bluetooth, LTE, GSM, or CDMA for communications. In some implementations, the controller 705 includes a communication module 715 to communicate with one or more sensors and one or more actuators associated with a drone system. In some implementations, the communication module uses a wireline technology such as Ethernet to receive events from one or more sources.

The memory 725 can store information such as data, instructions, or both. In some implementations, the memory 725 can store instructions for a control routine 772 that causes the processor 710 to issue a control command to adjust the perspective angle of a drone sensor such as a camera. In some implementations, the controller 705 can be included within a control unit such as control unit 810 of FIG. 8.

Figure 8:
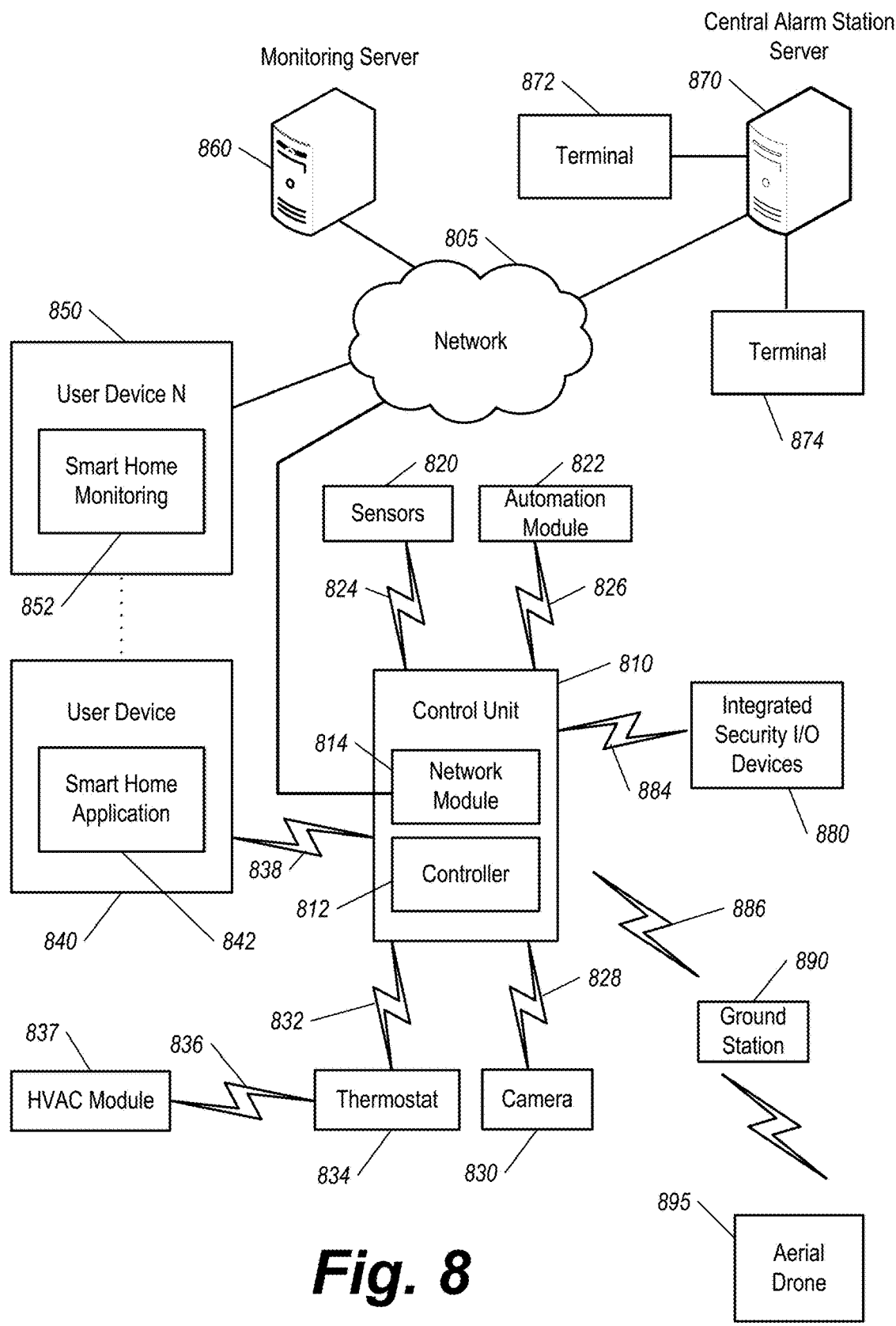
FIG. 8 shows a block diagram of an example security monitoring system.

FIG. 8 illustrates a block diagram of an example security monitoring system 800. The monitoring system 800 includes a network 805, a control unit 810, one or more user devices 840, 850, a monitoring server 860, and a central alarm station server 870. In some examples, the network 805 facilitates communications between the control unit 810, the one or more user devices 840, 850, the monitoring server 860, and the central alarm station server 870. This example further includes a drone system that includes a ground station 890 and an aerial drone 895. In some implementations, the control unit 810 can communicate the ground station 890, the aerial drone 895, or both via a communication link 886 to provide event information such as an alarm event. The aerial drone 895 can be configured to launch based on receiving an alarm event.

The network 805 is configured to enable exchange of electronic communications between devices connected to the network 805. For example, the network 805 can be configured to enable exchange of electronic communications between the control unit 810, the one or more user devices 840, 850, the monitoring server 860, and the central alarm station server 870. The network 805 can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 805 can include multiple networks or subnetworks, each of which can include, for example, a wired or wireless data pathway. The network 805 can include a circuit-switched network, a packet-switched data network, or any other network able to carry electronic communications (e.g., data or voice communications). For example, the network 805 can include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 805 can include one or more networks that include wireless data channels and wireless voice channels. The network 805 can be a wireless network, a broadband network, or a combination of networks including a wireless network and a broadband network.

The control unit 810 includes a controller 812 and a network module 814. The controller 812 is configured to control a control unit monitoring system (e.g., a control unit system) that includes the control unit 810. In some examples, the controller 812 can include a processor or other control circuitry configured to execute instructions of a program that controls operation of a control unit system. In these examples, the controller 812 can be configured to receive input from sensors, flow meters, or other devices included in the control unit system and control operations of devices included in the household (e.g., speakers, lights, doors, etc.). For example, the controller 812 can be configured to control operation of the network module 814 included in the control unit 810.

The network module 814 is a communication device configured to exchange communications over the network 805. The network module 814 can be a wireless communication module configured to exchange wireless communications over the network 805. For example, the network module 814 can be a wireless communication device configured to exchange communications over a wireless data channel and a wireless voice channel. In this example, the network module 814 may transmit alarm data over a wireless data channel and establish a two-way voice communication session over a wireless voice channel. The wireless communication device can include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 814 also can be a wired communication module configured to exchange communications over the network 805 using a wired connection. For instance, the network module 814 can be a modem, a network interface card, or another type of network interface device. The network module 814 can be an Ethernet network card configured to enable the control unit 810 to communicate over a local area network and/or the Internet. The network module 814 also can be a voice band modem configured to enable the alarm panel to communicate over the telephone lines of Plain Old Telephone Systems (POTS).

The control unit system that includes the control unit 810 includes one or more sensors. For example, the monitoring system can include multiple sensors 820. The sensors 820 can include a lock sensor, a contact sensor, a motion sensor, or any other type of sensor included in a control unit system. The sensors 820 also can include an environmental sensor, such as a temperature sensor, a water sensor, a rain sensor, a wind sensor, a light sensor, a smoke detector, a carbon monoxide detector, an air quality sensor, etc. The sensors 820 further can include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 820 can include a radio-frequency identification (RFID) sensor that identifies a particular article that includes a pre-assigned RFID tag.

The control unit 810 communicates with an automation module 822 and the camera 830 to perform monitoring. The automation module 822 is connected to one or more devices that enable home automation control. For instance, the automation module 822 can be connected to one or more lighting systems and can be configured to control operation of the one or more lighting systems. The automation module 822 can be connected to one or more electronic locks at the property and can be configured to control operation of the one or more electronic locks (e.g., control Z-Wave locks using wireless communications in the Z-Wave protocol. Further, the automation module 822 can be connected to one or more appliances at the property and can be configured to control operation of the one or more appliances. The automation module 822 can include multiple modules that are each specific to the type of device being controlled in an automated manner. The automation module 822 may control the one or more devices based on commands received from the control unit 810. For instance, the automation module 822 may cause a lighting system to illuminate an area to provide a better image of the area when captured by a camera 830.

The camera 830 can be a video/photographic camera or other type of optical sensing device configured to capture images. For instance, the camera 830 can be configured to capture images of an area within a building or within a residential facility 102-A monitored by the control unit 810. The camera 830 can be configured to capture single, static images of the area and also video images of the area in which multiple images of the area are captured at a relatively high frequency (e.g., thirty images per second). The camera 830 can be controlled based on commands received from the control unit 810.

The camera 830 can be triggered by several different types of techniques. For instance, a Passive Infra-Red (PIR) motion sensor can be built into the camera 830 and used to trigger the camera 830 to capture one or more images when motion is detected. The camera 830 also can include a microwave motion sensor built into the camera and used to trigger the camera 830 to capture one or more images when motion is detected. The camera 830 may have a "normally open" or "normally closed" digital input that can trigger capture of one or more images when external sensors (e.g., the sensors 820, PIR, door/window, etc.) detect motion or other events. In some implementations, the camera 830 receives a command to capture an image when external devices detect motion or another potential alarm event. The camera 830 may receive the command from the controller 812 or directly from one of the sensors 820.

In some examples, the camera 830 triggers integrated or external illuminators (e.g., Infra-Red, Z-wave controlled "white" lights, lights controlled by the automation module 822, etc.) to improve image quality when the scene is dark. An integrated or separate light sensor can be used to determine if illumination is desired and may result in increased image quality.

The camera 830 can be programmed with any combination of time/day schedules, system "arming state," or other variables to determine whether images should be captured or not when triggers occur. The camera 830 may enter a low-power mode when not capturing images. In this case, the camera 830 may wake periodically to check for inbound messages from the controller 812. The camera 830 can be powered by internal, replaceable batteries if located remotely from the control unit 810. The camera 830 may employ a small solar cell to recharge the battery when light is available. Alternatively, the camera 830 can be powered by the controller's 812 power supply if the camera 830 is co-located with the controller 812.

The system 800 also includes thermostat 834 to perform dynamic environmental control at the property. The thermostat 834 is configured to monitor temperature and/or energy consumption of an HVAC system associated with the thermostat 834, and is further configured to provide control of environmental (e.g., temperature) settings. In some implementations, the thermostat 834 can additionally or alternatively receive data relating to activity at a property and/or environmental data at a property, e.g., at various locations indoors and outdoors at the property. The thermostat 834 can directly measure energy consumption of the HVAC system associated with the thermostat, or can estimate energy consumption of the HVAC system associated with the thermostat 834, for example, based on detected usage of one or more components of the HVAC system associated with the thermostat 834. The thermostat 834 can communicate temperature and/or energy monitoring information to or from the control unit 810 and can control the environmental (e.g., temperature) settings based on commands received from the control unit 810.

In some implementations, the thermostat 834 is a dynamically programmable thermostat and can be integrated with the control unit 810. For example, the dynamically programmable thermostat 834 can include the control unit 810, e.g., as an internal component to the dynamically programmable thermostat 834. In addition, the control unit 810 can be a gateway device that communicates with the dynamically programmable thermostat 834.

A HVAC module 837 is connected to one or more components of an HVAC system associated with a property, and is configured to control operation of the one or more components of the HVAC system. In some implementations, the HVAC module 837 is configured to monitor energy consumption of the HVAC system components, for example, by directly measuring the energy consumption of the HVAC system components or by estimating the energy usage of the one or more HVAC system components based on detecting usage of components of the HVAC system. The HVAC module 837 can communicate energy monitoring information and the state of the HVAC system components to the thermostat 834 and can control the one or more components of the HVAC system based on commands received from the thermostat 834.

The system 800 further includes one or more integrated security devices 880. The one or more integrated security devices can include any type of device used to provide alerts based on received sensor data. For instance, the one or more control units 810 may provide one or more alerts to the one or more integrated security input/output devices. Additionally, the one or more control units 810 may receive one or more sensor data from the sensors 820 and determine whether to provide an alert to the one or more integrated security input/output devices 880.

Devices such as the sensors 820, the automation module 822, the camera 830, the thermostat 834, and the integrated security devices 880 communicate with the controller 812 over communication links 824, 826, 828, 832, 884, and 886. The communication links 824, 826, 828, 832, 884, and 886 can be a wired or wireless data pathway configured to transmit signals from the sensors 820, the automation module 822, the camera 830, the thermostat 834, and the integrated security devices 880 to the controller 812. The sensors 820, the automation module 822, the camera 830, the thermostat 834, and the integrated security devices 880 may continuously transmit sensed values to the controller 812, periodically transmit sensed values to the controller 812, or transmit sensed values to the controller 812 in response to a change in a sensed value.

The communication links 824, 826, 828, 832, 884, and 886 can include a local network. The sensors 820, the automation module 822, the camera 830, the thermostat 834, and the integrated security devices 880, and the controller 812 may exchange data and commands over the local network. The local network can include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 8 (CAT8) or Category 8 (CAT6) wired Ethernet network. The local network can be a mesh network constructed based on the devices connected to the mesh network.

The monitoring server 860 is an electronic device configured to provide monitoring services by exchanging electronic communications with the control unit 810, the one or more user devices 840, 850, and the central alarm station server 870 over the network 805. For example, the monitoring server 860 can be configured to monitor events (e.g., alarm events) generated by the control unit 810. In this example, the monitoring server 860 may exchange electronic communications with the network module 814 included in the control unit 810 to receive information regarding events (e.g., alerts) detected by the central alarm station server 870. The monitoring server 860 also may receive information regarding events (e.g., alerts) from the one or more user devices 840, 850.

In some implementations, the monitoring server 860 may route alert data received from the network module 814 or the one or more user devices 840, 850 to the central alarm station server 870. For example, the monitoring server 860 may transmit the alert data to the central alarm station server 870 over the network 805. The monitoring server 860 may store sensor and image data received from the monitoring system and perform analysis of sensor and image data received from the monitoring system. Based on the analysis, the monitoring server 860 may communicate with and control aspects of the control unit 810 or the one or more user devices 840, 850.

The central alarm station server 870 is an electronic device configured to provide alarm monitoring service by exchanging communications with the control unit 810, the one or more user devices 840, 850, and the monitoring server 860 over the network 805. For example, the central alarm station server 870 can be configured to monitor alerting events generated by the control unit 810. In this example, the central alarm station server 870 may exchange communications with the network module 814 included in the control unit 810 to receive information regarding alerting events detected by the control unit 810. The central alarm station server 870 also may receive information regarding alerting events from the one or more user devices 840, 850 and/or the monitoring server 860.

The central alarm station server 870 is connected to multiple terminals 872 and 874. The terminals 872 and 874 can be used by operators to process alerting events. For example, the central alarm station server 870 may route alerting data to the terminals 872 and 874 to enable an operator to process the alerting data. The terminals 872 and 874 can include general-purpose computers (e.g., desktop personal computers, workstations, or laptop computers) that are configured to receive alerting data from a server in the central alarm station server 870 and render a display of information based on the alerting data. For instance, the controller 812 may control the network module 814 to transmit, to the central alarm station server 870, alerting data indicating that a motion detection from a motion sensor via the sensors 820. The central alarm station server 870 may receive the alerting data and route the alerting data to the terminal 872 for processing by an operator associated with the terminal 872. The terminal 872 may render a display to the operator that includes information associated with the alerting event (e.g., the lock sensor data, the motion sensor data, the contact sensor data, etc.) and the operator may handle the alerting event based on the displayed information.

In some implementations, the terminals 872 and 874 can be mobile devices or devices designed for a specific function. Although FIG. 8 illustrates two terminals for brevity, actual implementations can include more (and, perhaps, many more) terminals. The one or more user devices 840, 850 are devices that host and display user interfaces. For instance, the user device 840 is a mobile device that hosts one or more native applications (e.g., the smart home application 842). The user device 840 can be a cellular phone or a non-cellular locally networked device with a display. The user device 840 can include a cell phone, a smart phone, a tablet PC, a personal digital assistant ("PDA"), or any other portable device configured to communicate over a network and display information. For example, implementations may also include mobile communication devices, tablets, electronic organizers, portable music players, other communication devices, and handheld or portable electronic devices for gaming, communications, and/or data organization. The user device 840 may perform functions unrelated to the monitoring system, such as placing personal telephone calls, playing music, playing video, displaying pictures, browsing the Internet, maintaining an electronic calendar, etc.

The user device 840 includes a smart home application 842. The smart home application 842 refers to a software/firmware program running on the corresponding mobile device that enables the user interface and features described throughout. The user device 840 may load or install the smart home application 842 based on data received over a network or data received from local media. The smart home application 842 runs on mobile devices platforms, such as iPhone, iPod touch, Google Android, Windows Mobile, etc. The smart home application 842 enables the user device 840 to receive and process image and sensor data from the monitoring system.

The user device 850 can be a general-purpose computer (e.g., a desktop personal computer, a workstation, or a laptop computer) that is configured to communicate with the monitoring server 860 and/or the control unit 810 over the network 805. The user device 850 can be configured to display a smart home user interface 852 that is generated by the user device 850 or generated by the monitoring server 860. For example, the user device 850 can be configured to display a user interface (e.g., a web page) provided by the monitoring server 860 that enables a user to perceive images captured by the camera 830 and/or reports related to the monitoring system. Although FIG. 8 illustrates two user devices for brevity, actual implementations can include more (and, perhaps, many more) or fewer user devices.

In some implementations, the one or more user devices 840, 850 communicate with and receive monitoring system data from the control unit 810 using the communication link 838. For instance, the one or more user devices 840, 850 may communicate with the control unit 810 using various local wireless protocols such as Wi-Fi, Bluetooth, Zwave, ZigBee, HomePlug (Ethernet over powerline), or wired protocols such as Ethernet and USB, to connect the one or more user devices 840, 850 to local security and automation equipment. The one or more user devices 840, 850 may connect locally to the monitoring system and its sensors and other devices. The local connection may improve the speed of status and control communications because communicating through the network 805 with a remote server (e.g., the monitoring server 860) can be significantly slower.

Although the one or more user devices 840, 850 are shown as communicating with the control unit 810, the one or more user devices 840, 850 may communicate directly with the sensors 820 and other devices controlled by the control unit 810. In some implementations, the one or more user devices 840, 850 replace the control unit 810 and perform the functions of the control unit 810 for local monitoring and long range/offsite communication.

In other implementations, the one or more user devices 840, 850 receive monitoring system data captured by the control unit 810 through the network 805. The one or more user devices 840, 850 may receive the data from the control unit 810 through the network 805 or the monitoring server 860 may relay data received from the control unit 810 to the one or more user devices 840, 850 through the network 805. In this regard, the monitoring server 860 may facilitate communication between the one or more user devices 840, 850 and the monitoring system.

In some implementations, the one or more user devices 840, 850 can be configured to switch whether the one or more user devices 840, 850 communicate with the control unit 810 directly (e.g., through link 838) or through the monitoring server 860 (e.g., through network 805) based on a location of the one or more user devices 840, 850. For instance, when the one or more user devices 840, 850 are located close to the control unit 810 and in range to communicate directly with the control unit 810, the one or more user devices 840, 850 use direct communication. When the one or more user devices 840, 850 are located far from the control unit 810 and not in range to communicate directly with the control unit 810, the one or more user devices 840, 850 use communication through the monitoring server 860.

In some implementations, the one or more user devices 840, 850 are used in conjunction with local sensors and/or local devices in a house. In these implementations, the system 800 includes the one or more user devices 840, 850, the sensors 820, the automation module 822, and the camera 830. The one or more user devices 840, 850 receive data directly from the sensors 820, the automation module 822, and the camera 830, and send data directly to the sensors 820, the automation module 822, and the camera 830. The one or more user devices 840, 850 provide the appropriate interfaces/processing to provide visual surveillance and reporting. In some implementations, the system 800 provides end users with access to images captured by the camera 830 to aid in decision making. The system 800 may transmit the images captured by the camera 830 over a wireless WAN network to the user devices 840, 850.

In some implementations, a state of the monitoring system and other events sensed by the monitoring system can be used to enable/disable video/image recording devices (e.g., the camera 830). In these implementations, the camera 830 can be set to capture images on a periodic basis when the alarm system is armed in an "Away" state, but set not to capture images when the alarm system is armed in a "Stay" state or disarmed. In addition, the camera 830 can be triggered to begin capturing images when the alarm system detects an event, such as an alarm event, a door-opening event for a door that leads to an area within a field of view of the camera 830, or motion in the area within the field of view of the camera 830. In other implementations, the camera 830 may capture images continuously, but the captured images can be stored or transmitted over a network when needed.

The described systems, methods, and techniques can be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:
1. A system comprising:
a controller configured to:
receive data identifying an event associated with one or more spatial coordinates or zones, and
in response to receiving the data identifying the event associated with the one or more spatial coordinates or zones:
determine, using configuration data for an aerial drone that includes a camera whose field of view is adjusted by an actuator, a current perspective angle of the camera while the aerial drone is docked with a ground station,
determine, using the one or more spatial coordinates or zones associated with the event, one or more coordinates or zones for the aerial drone to occupy to enable the camera to capture one or more images of the one or more spatial coordinates or zones,
determine, using the one or more spatial coordinates or zones associated with the event and the one or more coordinates or zones for the aerial drone to occupy, a target perspective angle of the camera to enable the camera to capture imagery of the one or more spatial coordinates or zones using the target perspective angle, and
cause the actuator to adjust the camera from the current perspective angle to the target perspective angle.

2. The system of claim 1, wherein the ground station comprises the actuator.

3. The system of claim 2, wherein the controller is configured to send one or more control commands to the ground station to engage the actuator to adjust the field of view.

4. The system of claim 2, wherein the ground station comprises the controller.

5. The system of claim 1, wherein the aerial drone comprises the actuator.

6. The system of claim 5, wherein the actuator comprises a propulsion system of the aerial drone.

7. The system of claim 6, wherein the ground station comprises a guide or lock, wherein the aerial drone is configured to use the propulsion system to generate thrust to move an orientation of the camera using the guide or lock.

8. The system of claim 1, wherein the aerial drone comprises the controller.

9. The system of claim 1, wherein the event is triggered by one or more sensors located at a property, an alarm system associated with the property, or both.

10. The system of claim 1, wherein the controller is configured to cause the actuator to change the field of view of the camera based on a user input.

11. The system of claim 1, comprising:
a sensor to detect an orientation of the camera, wherein the ground station comprises a marker, wherein the controller is configured to determine the current perspective angle of the camera based on data from the sensor with respect to the marker.

12. The system of claim 1, wherein the controller is configured to cause the aerial drone to deploy in response to the event.

13. The system of claim 1, wherein the controller is configured to cause the camera to capture imagery at the target perspective angle while the aerial drone is docked with the ground station.

14. The system of claim 1, wherein causing the actuator to adjust the camera comprises causing the actuator to adjust the camera from the current perspective angle to the target perspective angle while the aerial drone is docked with the ground station.

15. The system of claim 1, wherein determining the one or more coordinates or zones for the aerial drone to occupy comprises determining the one or more coordinates or zones for the aerial drone to occupy to enable the camera to capture the one or more images of the event.

16. A method comprising:
receiving, by a controller, data identifying an event associated with one or more spatial coordinates or zones; and
in response to receiving the data identifying the event associated with the one or more spatial coordinates or zones:
determining, by the controller using configuration data for an aerial drone that includes a camera whose field of view is adjusted by an actuator, a current perspective angle of the camera mounted on the aerial drone while the aerial drone is docked with a ground station;

determining, by the controller, using the one or more spatial coordinates or zones associated with the event, one or more coordinates or zones for the aerial drone to occupy to enable the camera to capture one or more images of the one or more spatial coordinates or zones;

determining, by the controller, using the one or more spatial coordinates or zones associated with the event and the one or more coordinates or zones for the aerial drone to occupy, a target perspective angle of the camera to enable the camera to capture imagery of the one or more spatial coordinates or zones using the target perspective angle; and adjusting, by the actuator communicatively coupled with the controller, the camera from the current perspective angle to the target perspective angle.

17. The method of claim 16, wherein the ground station comprises the actuator.

18. The method of claim 17, wherein adjusting the camera comprises sending one or more control commands to the ground station to engage the actuator to adjust a field of view of the camera.

19. The method of claim 17, wherein the ground station comprises the controller.

20. The method of claim 16, wherein the aerial drone comprises the actuator.

21. The method of claim 20, wherein the actuator comprises a propulsion system of the aerial drone.

22. The method of claim 21, wherein the ground station comprises a guide or lock, wherein the method comprises operating the propulsion system to generate thrust to move an orientation of the camera using the guide or lock.

23. The method of claim 16, wherein the event is triggered by one or more sensors located at a property, an alarm system associated with the property, or both.

24. The method of claim 16, wherein the ground station comprises a marker, and wherein determining the current perspective angle comprises:

obtaining data from a sensor configured to detect an orientation of the camera; and determining the current perspective angle of the camera based on the data from the sensor with respect to the marker.

25. The method of claim 16, comprising:

causing the aerial drone to deploy in response to the event.

26. The method of claim 16, comprising:

causing the camera to capture imagery at the target perspective angle while the aerial drone is docked with the ground station.

* * * * *